(12) United States Patent
Berghaus et al.

(10) Patent No.: US 8,745,869 B2
(45) Date of Patent: Jun. 10, 2014

(54) SCREWED PIPE JOINT AND METHOD FOR THE PRODUCTION THEREOF

(75) Inventors: Gerd Berghaus, Kürten (DE); Harald Pott, Hückeswagen (DE)

(73) Assignee: VOSS Fluid GmbH, Wipperfurth (DE)

( * ) Notice: Subject to any disclaimer, the term of this patent is extended or adjusted under 35 U.S.C. 154(b) by 160 days.

(21) Appl. No.: 13/395,314

(22) PCT Filed: Aug. 12, 2010

(86) PCT No.: PCT/EP2010/061734
§ 371 (c)(1),
(2), (4) Date: Mar. 9, 2012

(87) PCT Pub. No.: WO2011/029687
PCT Pub. Date: Mar. 17, 2011

(65) Prior Publication Data
US 2012/0169045 A1 Jul. 5, 2012

(30) Foreign Application Priority Data
Sep. 10, 2009 (DE) .......................... 10 2009 041 056

(51) Int. Cl.
*B21D 51/16* (2006.01)
(52) U.S. Cl.
USPC ........... 29/890.14; 29/469.5; 29/507; 29/511; 29/512; 29/282; 29/523; 29/446
(58) Field of Classification Search
USPC .............. 285/388, 387, 386, 389, 354, 382.4; 29/469.5, 507, 511, 512, 890.14, 282, 29/523, 446
See application file for complete search history.

(56) References Cited

U.S. PATENT DOCUMENTS

| 1,290,613 | A | * | 1/1919 | McDonough | ................ | 285/386 |
| 1,484,295 | A | * | 2/1924 | Bundy | ........................ | 285/382 |
| 2,406,488 | A | | 8/1946 | Brock | | |

(Continued)

FOREIGN PATENT DOCUMENTS

| DE | 1 167 608 | 4/1964 |
| DE | 1 175 639 | 8/1964 |

(Continued)

OTHER PUBLICATIONS

International Search Report of PCT/EP2010/061734 Mailed Jan. 4, 2011, 2 pages.

*Primary Examiner* — David E Bochna
(74) *Attorney, Agent, or Firm* — Brinks Gilson & Lione

(57) ABSTRACT

A screwed pipe connection for connecting a pipeline including a connection end having a formed wall region. The screwed pipe connection includes a connection part and a union joint part. Proceeding from the end face of the connection end of the pipeline, an outside cross-section of the pipeline increases and is larger than the nominal outside cross-section, then decreases again. Proceeding from the end face, a clear inside cross-section of the connection end is larger than the nominal inside cross-section and decreases to the nominal inside cross-section. The wall thickness on the end face is smaller than the nominal wall thickness, and wherein an inner material difference, resulting from the deviation of the inside cross-section from the nominal inside cross-section, and an outer material difference, resulting from the deviation of the outside cross-section from the nominal outside cross-section, deviate from one another by a maximum of 30 percent.

13 Claims, 13 Drawing Sheets

(56) References Cited

U.S. PATENT DOCUMENTS

| | | | | |
|---|---|---|---|---|
| 3,113,792 A | * | 12/1963 | Brown | 285/388 |
| 4,575,044 A | * | 3/1986 | Gentry | 285/388 |
| 4,980,961 A | * | 1/1991 | Caudill | 29/523 |
| 5,016,920 A | * | 5/1991 | Anderson | 285/354 |
| 5,131,145 A | * | 7/1992 | Badoureaux | 29/512 |
| 5,283,951 A | * | 2/1994 | Davenport et al. | 285/354 |
| 5,529,349 A | * | 6/1996 | Gibbs et al. | 285/354 |
| 5,634,674 A | * | 6/1997 | Fuser | 285/382 |
| 5,651,173 A | * | 7/1997 | Roy et al. | 29/512 |
| 5,791,693 A | * | 8/1998 | Crawford | 285/354 |
| 5,893,591 A | | 4/1999 | Ebel et al. | |
| 6,237,968 B1 | * | 5/2001 | Bohnes | 285/354 |
| 6,260,401 B1 | | 7/2001 | Tada | |
| 6,327,771 B1 | * | 12/2001 | Anglin et al. | 29/523 |
| 6,899,358 B2 | * | 5/2005 | Richardson | 285/386 |
| 6,928,732 B2 | * | 8/2005 | Sakai et al. | 29/523 |
| 6,945,569 B1 | | 9/2005 | Diaz et al. | |
| 7,000,953 B2 | * | 2/2006 | Berghaus | 285/354 |
| 7,237,420 B2 | | 7/2007 | Berghaus | |
| 7,665,772 B2 | | 2/2010 | Pott et al. | |
| 7,735,473 B2 | * | 6/2010 | Kato et al. | 285/386 |
| 7,963,572 B2 | * | 6/2011 | Bull et al. | 285/386 |
| 8,079,621 B2 | * | 12/2011 | Ferlin et al. | 285/353 |
| 8,292,334 B2 | * | 10/2012 | Knight | 285/382.4 |

FOREIGN PATENT DOCUMENTS

| | | |
|---|---|---|
| DE | 195 20 099 | 1/1997 |
| DE | 101 08 309 | 3/2002 |
| DE | 20 2004 004 940 | 8/2005 |
| EP | 1 054 203 | 11/2000 |
| EP | 1 260 750 | 11/2002 |
| FR | 2 860 058 | 3/2005 |
| GB | 1 117 987 | 6/1968 |
| GB | 2 160 280 | 12/1985 |

* cited by examiner

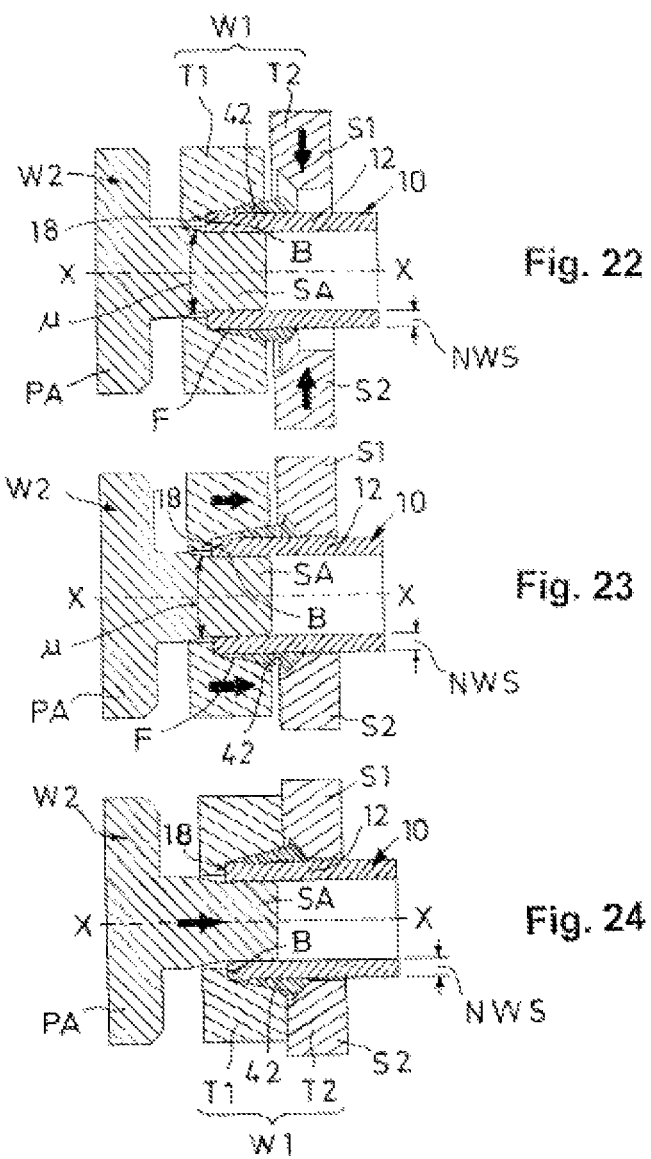

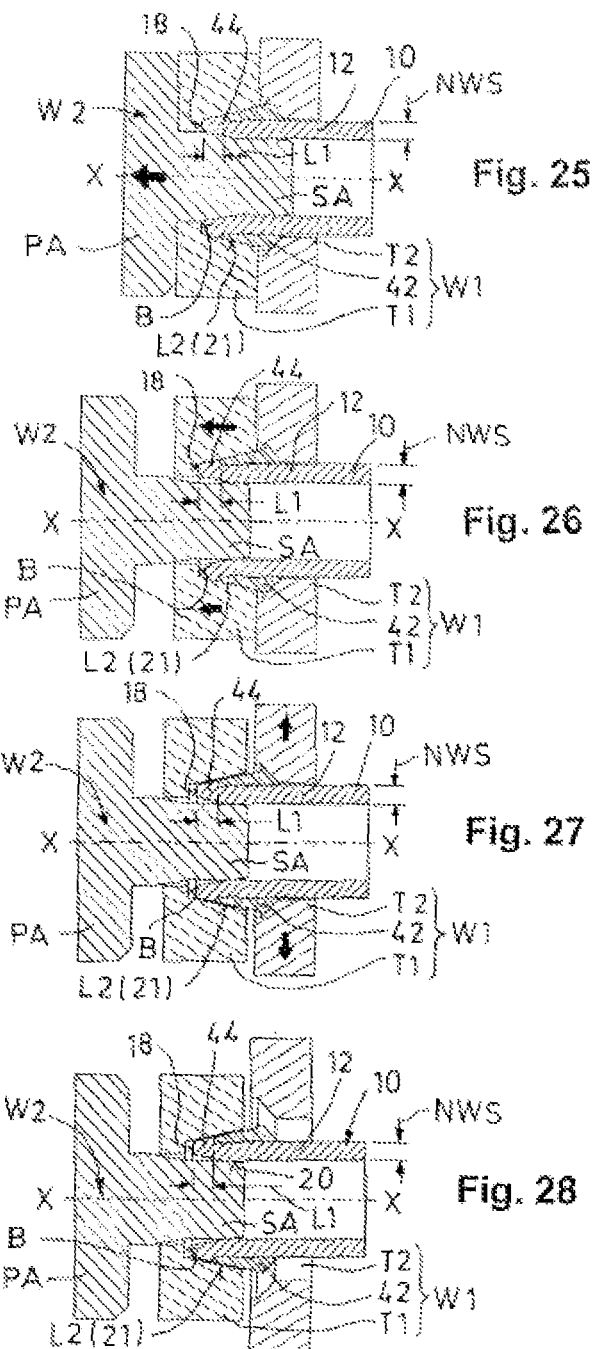

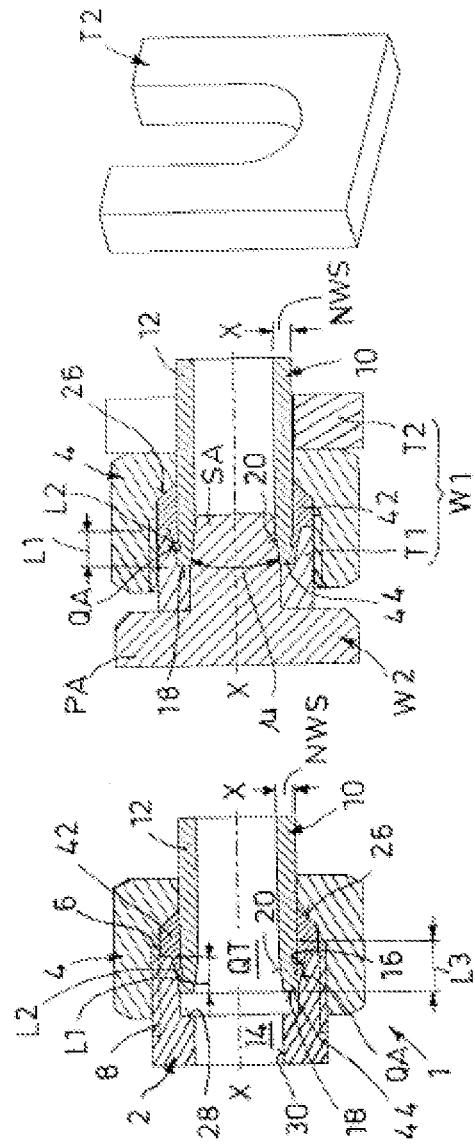

SCREWED PIPE JOINT AND METHOD FOR THE PRODUCTION THEREOF

BACKGROUND OF THE INVENTION

1. Field of the Invention

The present invention relates to a screwed pipe connection for connecting a pipeline having a nominal outer cross-section, a nominal inner cross-section, a nominal wall thickness, and a connection end with a wall region formed by shaping.

These and other features and advantages of the present invention will become more readily appreciated when considered in connection with the following detailed description and appended drawings, wherein:

These and other features and advantages of the present invention will become more readily appreciated when considered in connection with the following detailed description and appended drawings, wherein:

Furthermore, the invention relates to a method for producing a screwed pipe joint, in particular a screwed pipe joint of the type described above, wherein a wall region of a connection end of a pipeline is subject to reshaping and with the application of force in axial direction of the pipeline inside a mold of a tool, an outer contour of the connection end is formed.

2. Description of Related Technology

From the international standard ISO 8434-1, screw joints are known that are used for the sealed connection of a pipe to a pipe-connection part or a screw-in part. In this standard, so-called 24° cone connectors of various designs are described. These connections comprise a connection part and a union joint part that can be screwed into the connection part for sealed retention of the pipeline, wherein the connection part has a receiving opening with an inner conical bore that widens outward in the direction of the pipeline, and wherein the connection end of the pipeline can be inserted in a positive and/or force-fitting manner between the connection part and the union joint part. The angle designation of 24° refers here to the opening angle of the inner conical bore of the connection part, which widens outward in the direction of the pipeline and is embodied in particular as a tapered bore.

One type of embodiments according to the standard ISO 8434-1 has screw joints that are produced in each case using a cutting ring. As is known, such a cutting ring is an annular part located on the outer circumference of the pipeline that clamps the pipeline in a positive and/or force-fitting manner at its connection end, between the connection piece and the union joint part. On the side facing the connecting part, the cutting ring has a cutting section with at least one cutting edge which, when the union joint part is tightened, is pushed due to the effect of the conical bore of the connection part axially toward the connection part and which, at the same time, cuts radially into the wall of the pipe to be connected. Here, the cross-section of the connection end of the pipeline—except for a small region that is deformed by the cutting edge—is embodied in the same manner as the rest of the pipe body, in particular in respect of its inner and outer diameter; thus, it has the same diameter.

Screw connections comprising cutting rings of various designs are also known from DE-AS 1 167 608, DE-AS 1 175 639, GB 1 117 987 A, U.S. Pat. No. 2,406,488 A and EP 1 776 539 B1 and have long been a standard in fluid technology. The advantages of such connections are low system costs for screw-connection components and machines, the short minimum distance to a pipe bend required when making the connections, which allows for a compact design and the possibility of direct assembly inside the screw connection without the use of assembly machinery. It is considered disadvantageous that the proper handling of the cutting-ring systems during pre- and final assembly requires technical knowledge and experience, that the quality of an achieved preassembly result can only be partially verified, that the cutting rings have difficulty cutting into high-strength steels, and that after a preassembly of the cutting ring, gaps often appear between the cutting ring and the pipe due to elastic deflection of the ring, which gaps must be closed during final assembly.

In addition to the screw joints described above, such screw connections are also known from the international standard ISO 8434-2, where the connection part does not have a conical bore widening outward in the direction of the pipeline but rather an outer conical bore that tapers inward. In particular, in ISO 8434-2, this is a flanged 37° cone connector, wherein the pipeline can be inserted with its connection end that is flanged outwardly in a positive manner by means of an annular cuff-part between the connection part and the union joint part. The inner surface of the flanged pipe-end region abuts the complementary-shaped outer side of the outer bore of the connection part. The angle designation here refers to the opening angle of the outer bore of the connection part, which tapers inward in the direction of the pipeline. This system is also called a JIC system. Whereas with the 24° systems according to ISO 8434-1, an axially induced assembly force is amplified into a clamping and sealing force acting against the cone plane that is approximately 4.8 times normal, in the case of the 37° systems according to ISO 8434-2, an axially induced clamping and sealing assembly-force acting against the cone plane is amplified to only about 1.7 times normal. Thus, compared to 24° cone connectors, the 37° cone connectors have fundamental disadvantages with regard to tightness and assembly behavior.

Screw pipe connections for connecting prefabricated pipelines that have in each case, at their connection ends, a toroidal bulge formed by a compression-reshaping process, are known in numerous embodiments, and devices for producing said screw pipe connections are normally referred to as pipe-forming systems. In these pipelines, proceeding from an end face of the connection end facing the connection part in a first longitudinal section, an outer diameter of the pipeline formed by the reshaped wall area of the connection end increases in axial direction, becoming larger than the nominal outer diameter, and then, in a second longitudinal section, decreasing again in axial direction, until it reaches the nominal outer diameter behind the connection end. The changes in cross-section may occur progressively or suddenly, whereas in the latter case, the second longitudinal section is nearly zero. For the purpose of example only, with respect to the type and production of such screw connections, reference is made to the publications DE 195 20 099 C2, DE 195 26 316 C2 and EP 1 054 203 A1.

Screwed pipe joints designed in this way normally have great installation height, because they require long straight clamping lengths up to the pipe bend for reshaping of the connection end for the pipe. In these regions, it is a disadvantage that insertion can also result in damage to an anticorrosion coating of the pipeline, if such a coating is present. Furthermore, the metal-forming machine tools are often expensive, because they must be designed to produce very considerable forces (for example 1,000 kN with a pipe diameter of 42 mm).

With such screwed pipe joints, there is also a major disadvantage in that during assembly, when tightening the screwed connection (union nut), the pipe tends to revolve along with the nut. This disadvantage is eliminated by a screwed pipe joint as described in EP 1 260 750 B1. In this screwed joint, a support ring is provided, it being possible to clamp the pipeline with its toroidal bulge and the screwed connection in a positive manner between the connection piece—called the coupling connection in the cited document—and the support ring located on the pipeline between the toroidal bulge and the screwed connection. The support ring, with the toroidal bulge, forms a specially designed contact surface, in the region of which, when tightening the screwed joint, essentially no radial force components occur.

The cited screwed pipe joints have stood the test of use. With them, in addition to the advantage of there being a possibility to employ a soft seal at the pipe end, there is also the possibility of checking, in a simple manner, in the preassembly results, the quality of the bead contour produced, and there can subsequently be reliable final assembly characterized by the following advantageous features:

there is already direct contact between pipe and coupling cone during manual tightening of the screwed connection;
assembly can be performed with low tightening torque up to a stop position;
the system is uncritical to over- and under-tightening.

In order to produce contoured pipe ends of this or a similar kind, which particularly in the tapering longitudinal region are provided with a corresponding bulge contour, a device for plastically deforming tool elements, as described in EP 1 494 827 B1, can be used. Such a device has a molding assembly actuated by the pressure of a fluid and a pre-tensioning unit that is actuated by a fluid pressure, particularly a hydraulic pressure, the two units being arranged on a common longitudinal axis, as well as tensioning elements that are tensible by means of the pre-tensioning unit. Here, for reshaping, a toolkit is required that is comprised, in addition to the tensioning elements, of a molding head, by means of which the contour is formed at the pipe end through an axial compression process. This is therefore a method of the type referred to at the beginning.

The problem, which forms the basis of the invention, consists of making a screwed pipe joint of the type referred to at the beginning and a method for its production, which is characterized by a guarantee of high static and dynamic resilience of the screwed pipe joint due to reduced installation height and improved resistance to corrosion, or as the case may be by less complex and expensive mechanical production, and which avoids the disadvantages of the prior art described above.

SUMMARY OF THE INVENTION

According to one implementation of the invention, this is achieved for the screwed pipe joint in that, proceeding from the end face facing the connection part, a clear inner cross-section of the pipeline in a third longitudinal section of the connection end is larger than the nominal inner cross-section and decreases in axial direction until it reaches, behind the connection end, the value of the nominal inner cross-section, wherein on the end face, a wall thickness of the pipeline is greater than the nominal wall thickness and changes in axial direction until it reaches the value of the nominal wall thickness behind the connection end, and wherein an inner material difference that results from the deviation of the inner cross-section from the nominal inner cross-section in the third longitudinal section and an outer material difference that results from the deviation of the outer cross-section from the nominal outer cross-section in the first longitudinal section and in the second longitudinal section deviate from each other by a maximum of 30 percent.

For the method of producing a screwed pipe joint, this is accomplished according to the invention by the wall region of the connection end, during radial widening of a nominal inner cross-section of the pipeline, being compressed by a force acting at an angle to the axial direction into the mold of the tool element.

In this way, the connection end of the pipeline for the inventive screwed pipe joint can be shaped in an advantageous manner, the shape of the tool being the negative contour of the in particular convex contour that is to be formed on the outside circumference of the wall of the connection end.

Compared to the previously mentioned known screwed pipe joints that use cutting rings, the inventive screwed pipe joint is characterized by significantly improved assembly behavior. The quality of the cone contour of the connection end of the pipeline produced according to the invention can be visually checked in a simple manner; during assembly the occurrence of a disproportionate increase in force indicates that a stop position has been reached; and the connection is insensitive to over and under-tightening.

Furthermore, the inventive screwed pipe joint can be used without problem for high-strength pipes, such as stainless steel pipes, at the same time as the costs that reflect the technological effort of producing a screwed joint are at approximately the same level as those for the production of a screwed joint with a cutting ring.

Compared to the 37° flanged cone connectors known from ISO 8434-2 mentioned above, the inventive screwed pipe joint exhibits greater clamping and sealing forces and requires lesser tightening torque during assembly. This reduces the risk of the pipes rotating as well during assembly.

The inventive screwed pipe joint displays good assembly behavior similar to that of the previously mentioned screwed pipe joints that can be produced by means of the known pipe-forming systems, and which are known particularly from EP 1 260 750 B1. However, with the inventive method, in which predominantly radial compression is performed, the only forces needed are reduced by up to 70 percent compared to the known compression methods that entail predominantly axial compression. This is possible particularly because when reshaping the wall region of the connection end during the compression molding process in order to radially widen, compress and contour, a cone-tool element based on a force-amplifying principle is used in the inner region of the pipe, by means of which very high radial forces can be produced using low axial forces. Shortening of the pipeline during reshaping is almost completely avoided with this method. At the point of contact between the cone of the tool element and the pipe-end that is to be reshaped, high normal forces can be transmitted vertically to the contact surface, particularly when there is a small point angle of the tool. In this way, a considerable reduction in machine cost can be achieved.

Furthermore, during reshaping, a clamping length of the pipeline can advantageously be kept so short that in a piping system with an inventive screwed pipe joint, considerably shorter straight pipe ends can be made between the screwed pipe joint and an adjacent pipe elbow, which leads to considerably reduced installation height. Whereas, for example, with a known forming machine with a pipe diameter of 42 mm, when the required clamping length is approximately 60 mm, when the inventive method is employed, this clamping length can be less than 20 mm, and is thus kept so short that outside the screwed pipe joint—that is, in particular outside the area that is covered by the union joint part after screwing—there are no clamping jaw impressions from the tool, and thus no corrosion problems occur later in the pipeline.

Additional advantageous design features of the invention, and thus advantages achieved, are contained in the sub-claims and the following description.

BRIEF DESCRIPTION OF THE DRAWINGS

The invention will be explained in more detail by means of a plurality of preferred embodiments shown in the drawing. The following is shown:

FIGS. 22 to 28 are axial sections respectively, of different process steps of a method according to the invention shown by a connection end of a pipeline according to the fourth embodiment of a screwed pipe joint with a toolkit according to the ninth embodiment, FIG. 29 is a representation similar to that seen in FIG. 20, of an axial section through a fifth embodiment of a screwed pipe joint in a screwed-in state of assembly according to the present invention, FIG. 30 is a representation similar to that seen in FIG. 21, of an axial section through a connection end of a pipeline of the fifth embodiment of the screwed pipe joint, together with a toolkit in a tenth embodiment, and FIG. 31 is a three-dimensional representation, of a backing plate of the toolkit shown in FIG. 30.

DETAILED DESCRIPTION

Figure 1:
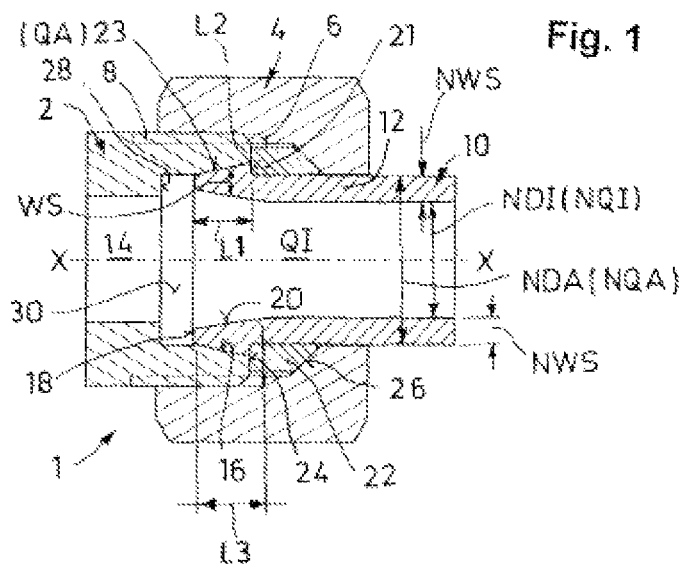
FIG. 1 is an axial section through a first embodiment of a screwed pipe joint in a screwed-in state of assembly according to the invention.

In the different figures of the drawing, the same and corresponding parts are always provided with the same reference signs and are therefore, as a rule, only described once.

As can be seen in the first instance from FIG. 1, a screwed pipe joint 1 according to the principles of the invention comprises a connection part 2 in the form of a coupling connection and a union joint part 4 that is normally designed as a union nut that can be screwed by means of an inside thread 6 onto an outside thread 8 of the connection part 2. A pipeline 10, which is to be connected to it, comprises a connection end 12 that can be inserted into a receiving opening 14 of the connection part 2. The receiving opening 14 has a conical bore 16 that widens outward in the direction of the pipeline 10. For sealed retention of the pipeline 10, a wall region of the connection end 12 of the pipeline 10 can be inserted between the connection part 2 and the union joint part 4 in a positive and/or force-fitting manner.

The pipeline 10 has a nominal inner diameter NDI and a nominal outer diameter NDA. These fixed dimensions for the pipeline determine a nominal inner cross-section NQI and a nominal outer cross-section NQA, as well as a nominal wall thickness NWS and are not drawn into all the figures for reasons of clarity.

Proceeding from an end face 18 of the connection end 12 of the pipeline 10 that faces the connection part 2, an outer cross-section QA of the pipeline 10 that is formed by the outer sheath surface of the connection end 12 initially increases in a first longitudinal section L1 in axial direction X-X, becoming larger than the nominal outer cross-section NQA. In a second longitudinal section L2, the outer cross-section QA then decreases again in axial direction X-X until it reaches the value of the nominal outer cross-section NQA behind the connection end 12.

Proceeding from the end face 18 facing the connection part 2, a clear inner cross-section QI of the pipeline 10, in a third longitudinal section L3 of the connection end 12, is larger than the nominal inner cross-section NQI and decreases in axial direction X-X until it reaches the value of the nominal inner cross-section NQI behind the connection end 12.

At the same time, at the end face 18, a wall thickness WS of the pipeline 10 is smaller than the nominal wall thickness NWS, changing in axial direction X-X into the value of the nominal wall thickness NWS behind the connection end 12.

Each contour of the connection end 12 of the embodiments of the invention represented in FIGS. 1, 2a, 4, 16, 17a, 18, 20 and 29 shows these features in a different form. The cross-section widening and tapering can occur progressively or suddenly. In this respect, in the case of a sudden change, particularly in the outer cross-section QA (except in the embodiment in FIGS. 18 and 19), the length in the second longitudinal section L2 assumes the value zero. For the first longitudinal section L1, it is preferable that the outer cross-section QA of the pipeline 10 that is formed by the wall region of the connection end 12 widens complementarily, that is at the same angle to the conical bore 16 of the connection part 2 that widens outward in the direction of the pipeline 10.

It is also preferred that the clear inner cross-section QI tapers conically proceeding from the end face 18 of the connection end 12 of the pipeline 10 that faces the connection part 2. The tapering is designated in the drawing with the reference sign 20.

When the clear inner cross-section QI of the pipeline 10 decreases, proceeding from the end face 18 of the pipeline 10, the smallest value of this inner cross-section QI in particular is determined by the nominal inner diameter NDI of the pipeline 10. When the outer cross-section QA of the pipeline 10 decreases in the second longitudinal section L2, the smallest value of this outer cross-section QA in particular is determined by the nominal outer diameter NDA of the pipeline 10.

The third longitudinal section L3 can preferably be at least exactly as large as the first longitudinal section L1 or the sum of the first longitudinal section L1 and the second longitudinal section L2.

Figure 2:
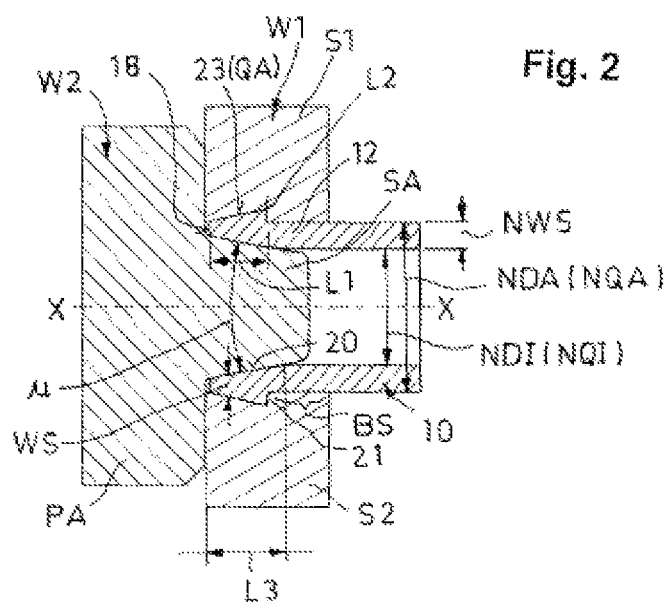
FIG. 2 is an axial section through a connection end of a pipeline of the first embodiment of screwed pipe joint according to the invention, along with a first embodiment of a toolkit for implementing a method according to the invention.
Figure 2A:
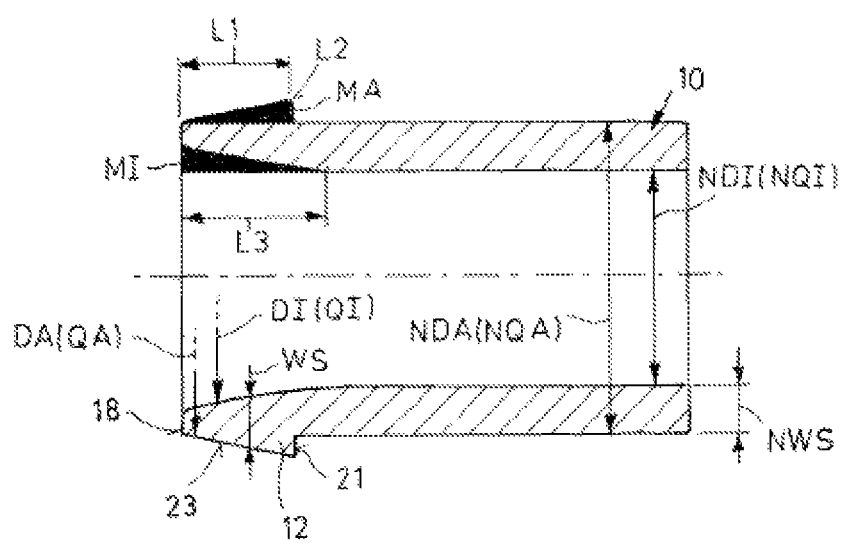
FIG. 2a is an axial section through a connection end of a pipeline of the first embodiment, enlarged.

In the first embodiment of the inventive screwed pipe joint 1, the contour of the connection end 12—as can be seen in FIG. 1 and the other corresponding drawing figures, and particularly well in the enlarged representation in FIG. 2a—seen in a axial section, is designed with respect to the basic shape essentially as an isosceles trapezoid, wherein the shorter of the two parallel sides of the trapezoid forms the end face 18 of the connection end 12 of the pipeline 10. One part of the longer of the two parallel sides of the trapezoid lies in the pipe wall, whereas the other part forms an annular surface 21 around the pipeline 10 that is aligned essentially vertically to the longitudinal axis X-X. Due to this annular surface 21, the outer cross-section QA of the pipeline 10 that is formed by the wall region of the connection end 12 decreases—and does so suddenly—whereas the radially outer limb 23 of the trapezoid that runs from the end face 18 to the annular surface 21 is responsible for the increase in the outer cross-section QA that occurs—in particular progressively—in the first longitudinal section L1.

According to the inventive method—as FIG. 2 initially shows—the wall region of the connection end 12 is compressed, by means of a force that acts at an angle to the axial direction X-X, into a form F, in particular into a form F of a first tool element W1, during radial widening of the nominal inner cross-section NQI of the pipeline 10. Preferably, during this process, the connection end 12 is produced by cold forming, so that the connection end 12 is preferably comprised of a cold-formed metal, in particular of a cold-formed steel or stainless steel.

The radial widening 20 is produced by means of a second stamp-like reshaping tool element W2—proceeding from the end face 18 of the connection end 12—moved axially into the connection end 12 of the pipeline 10, which simultaneously forces the material of the wall region that is to be reshaped out of its original position into the mold, in particular in the case of the first embodiment of the toolkit, into the mold of the first tool element W1. By means of the preferably conically designed, stamp-like tool element W2, a conical bore is produced, in particular a radial widening 20, wherein, due to the work-piece form, which is determined by work surfaces running at an angle to the longitudinal axis X-X, an amplification of force occurs. In this way, with small axial forces, it is possible to produce very high forces that act radially, or as the case may be at an angle to the longitudinal axis X-X. In the process, high normal forces are transmitted vertically to the contact surface between tool element W2 and pipe end 12 at the contact point between the cone of the tool element and the pipe end 12 that is to be reshaped.

FIG. 2a illustrates once again—using the example of the pipe end 12 exclusively—the combination of essential features that is achieved using the inventive method. Proceeding from the end face 18 of the connection end 12, the outer cross-section QA of the pipeline 10 is larger at the end of the first longitudinal section L1 than the nominal outer cross-section NQA. In the second longitudinal section L2, which lies behind it, seen in axial direction X-X from the end face, the outer cross-section QA once again decreases and reaches, behind the connection end 12, the value of the nominal cross-section NQA. The clear inner cross-section QI of the pipeline 10 is, at the end face 18 in the third longitudinal cross-section L3 of the connection end 12, larger than the nominal inner cross-section NQI and decreases in axial direction X-X. Behind the connection end 12, the clear inner cross-section QI reaches the value of the nominal inner cross-section NQI. At the end face 18, a wall thickness WS of the pipeline 10 is smaller than the nominal wall thickness NWS and changes in axial direction to reach the value of the nominal wall thickness NWS behind the connection end 12.

It is furthermore characteristic here that an inner material difference MI, which results from the deviation of the inner cross-section QI from the nominal inner cross-section NQI in the third longitudinal section L3, corresponds, due to the inventive reshaping, to an outer material difference MA, which results from the deviation of the outer cross-section QA from the nominal outer cross-section NQA in the first longitudinal section L1 and in the second longitudinal section L2. "Corresponding" is here understood as meaning that the inner material difference MI and the outer material difference MA are preferably of the same magnitude, deviating from each other by no more than 15 percent, although maximum deviations of 30 percent are also permissible. The material differences MI, MA result in each case from the rotation volumes of the inner and outer surfaces, drawn in black in FIG. 2a, multiplied by the density of the material at the pipe end 12.

If there is purely radial compression, the inner material difference MI and the outer material difference MA are of equal magnitude. If, however, axial compression is also permissible, the outer material difference MA occurs proportionately at the expense of shortening the length of the pipeline 10.

Figure 3:
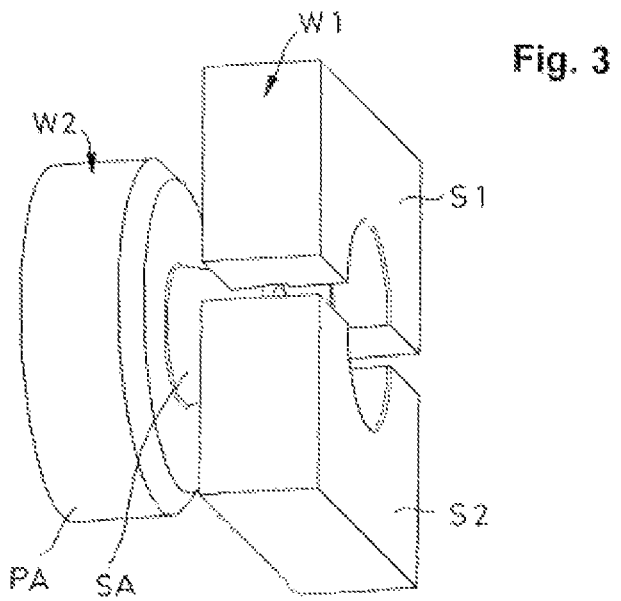
FIG. 3 is a three-dimensional exploded view, of the toolkit shown in FIG. 2.

The tool elements W1, W2 shown in FIG. 2—without pipeline 10—are also depicted in FIG. 3. Here, it is for example obvious from the representation that as a first tool element W1 for defining a clamping range for the pipeline 10, at least one clamping element can be used, which will preferably be comprised of a plurality—in the case shown—of two segments S1, S2, which during reshaping seamlessly enclose the outside surface of the pipeline 10. In the first tool element W1, the regions for shaping and the regions with the clamping element, or as the case may be, the clamping elements, form a structural unit.

According to the first embodiment of the inventive screwed pipe joint 1, it is provided, as in the majority of the other embodiments shown—that in the second longitudinal section L2, an annular part is arranged that encloses the pipeline 10, by means of which annular part the connection end 12 of the pipeline 10 can be inserted in a positive and/or force-fitting manner between the connection part 2 and the union joint 4. In the first embodiment, this annular part is a support ring, or as the case may be, a distance ring 22, which rests between the union joint 4 and the contour of the connection end 12 on an axially parallel pipe section and forms, with the contour, a contact surface, namely on the annular surface 21. In the state of assembly shown in FIG. 1, this annular surface 21 extends axially flush to a surface 24 on the face side of the connection part 2, against which the distance ring 22 also abuts. On the other side, a conically running contact surface 26 is formed on the distance ring 22 facing the union nut.

In its receiving opening 14, the connection part 2 has a radially stepped surface 28 which, depending on the length of the part of the connection end 12 of the pipeline 10 that protrudes into the receiving opening 14, can serve to axially support the pipeline 10 through contact with the end face 18, or it can be distanced from this end face 18, as shown in FIG. 1. In this way, between the inner conical bore 16 and the stepped surface 28 inside the receiving opening 14 of the connection part 2, a cylindrical inner transition surface 30 is formed, which has an inner diameter that corresponds to approximately the smallest outer diameter of the connection end 12.

Figure 4:
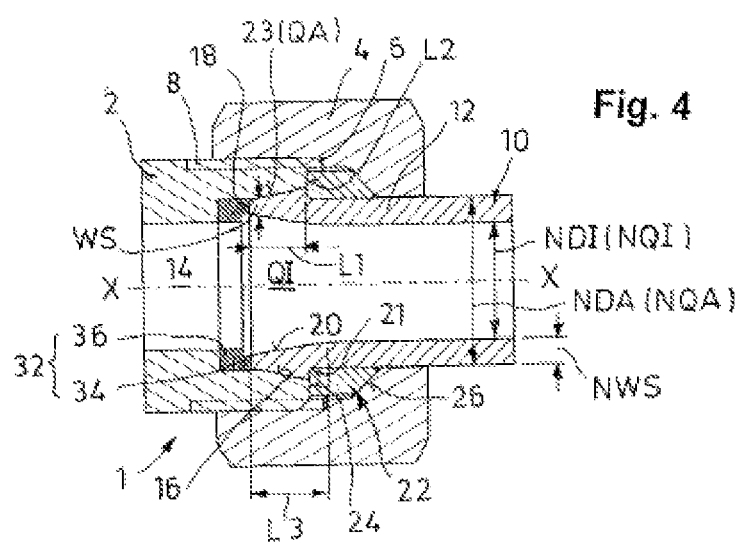
FIG. 4 is an axial section through a modified first embodiment of a screwed pipe joint in a screwed-in state of assembly according to the invention.

A seal 32 can advantageously be positioned on the stepped surface 28 in the space bridged by the cylindrical inner transition surface 30, as shown in FIG. 4. The seal 32 may, as shown, be designed as having two parts, which consists of an elastomer sealing ring 34 and a retaining ring 36 intended for this purpose, which is made of thermoplastic or duroplastic synthetic material or metal. As already mentioned, FIGS. 5 to 10 depict the process of the inventive method.

Figure 5:
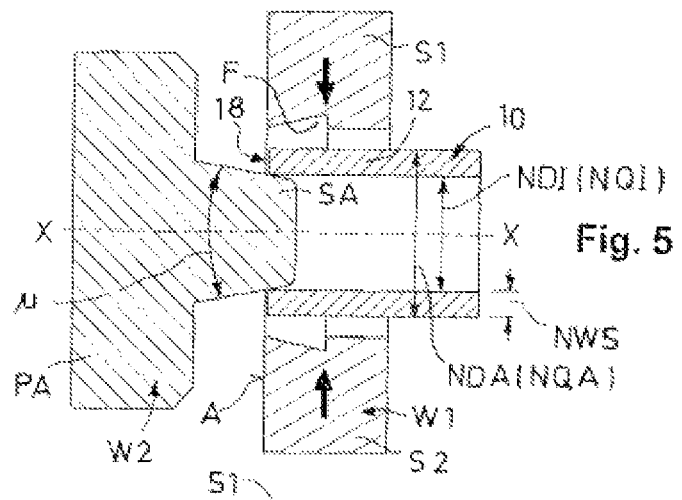
FIGS. 5 to 10 are axial sections respectively, of different process steps of the inventive method, shown from a connection end of a pipeline according to the first embodiment of a screwed pipe joint with a toolkit according to the first embodiment.

In the first instance FIG. 5 shows, with reference to FIG. 3, the previously mentioned segments S1, S2 of the first tool element W1, which also serves as a clamping element for the pipeline 10 and as shaping element for the contour that is to be formed on the connection end 12. The pipeline is located between the segments S1, S2.

The second tool element W2 is designed as rotationally symmetrical to a longitudinal axis X-X and features a plate-like section PA for clamping into a pressure-producing device and a conical stamping section SA for deforming the pipeline 10. The smallest diameter of the conical stamping section SA is smaller than the nominal inner diameter NDI of the pipeline 10, so that the pipeline 10 can be slid without problems onto the clear end of the stamping section SA, or as the case may be the stamping section SA can be inserted into the pipeline 10, as shown in FIG. 5.

Figure 6:
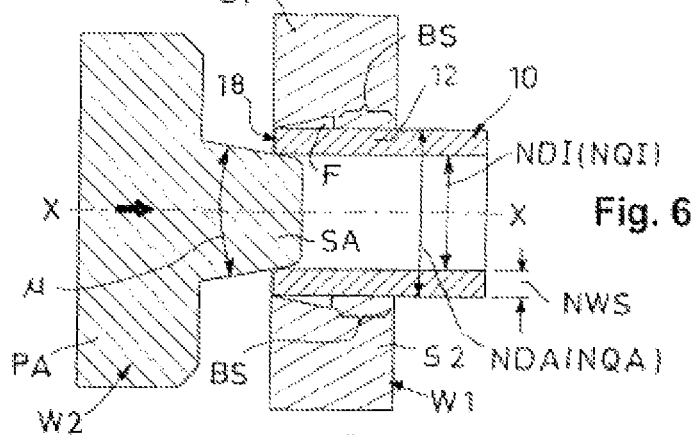

Based on this state, the segments S1, S2 of the first tool element W1 are moved toward each other in the sense of the arrows shown in FIG. 5, so that the segments S1, S2 seamlessly enclose the outside surface of the pipeline 10. The first tool element W1 closed in this way is shown in FIG. 6. Here, the pipeline 10 is fixated opposite the first tool element W1 in a positive and/or form-fitting manner—in particular against axial displacement during subsequent reshaping—in a clamping range which—seen from the end face 18 of the connection end 12—lies behind the longitudinal regions that are to be reshaped.

The clamping range is designated in FIGS. 6 to 9, in each case with the reference sign BS. As already mentioned above, this clamping range BS can be selected as optimally small, or as the case may be, short, compared to a reshaping by purely axial compression of the pipe end—so small that in the inventive screwed pipe joint 1, it is completely covered by the screwed connection 4.

Figure 7:
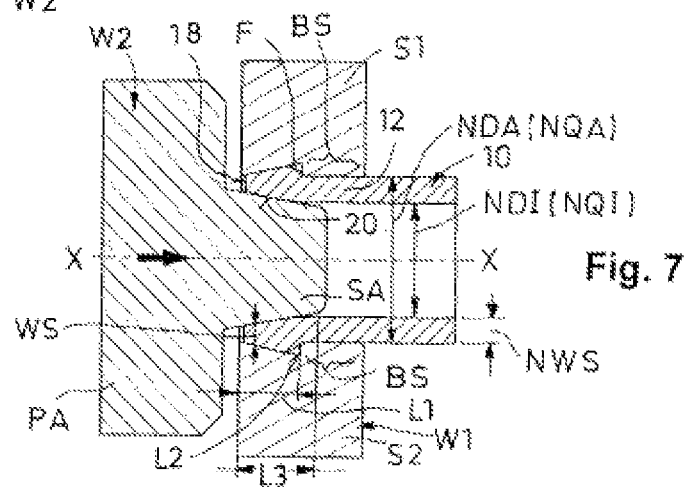

Once the clamped state of the pipe has been established, radial widening of the connection end 12 commences in that the stamping section SA of the second tool element W2 is driven axially farther into the connection end 12 of the pipeline 10. This is indicated by the arrow in FIG. 6. At the same time, using the second tool element W2, also the material of the wall region is forced out of its original position and into the mold of the first tool element W1. The mold is indicated in FIGS. 5 to 7 and in FIG. 10 by the reference sign F. In the process, the outer conical form of the tool element W2 produces, as a radial widening 20, an inner conical form in the connection end 12. Via the contact surface between the outer cone of the tool element W2 and the inner cone—which is in the process of being formed—of the pipe end that is to be reshaped, high normal forces—particularly in comparison to the axial forces introduced in the direction of the longitudinal axis X-X—are transmitted, which act at an angle to the axis X-X, but vertically to the contact surface, when a point angle μ of the second tool element W2 lies within the range of 5° to 60°, preferably within the range 20° to 40°.

Figure 8:
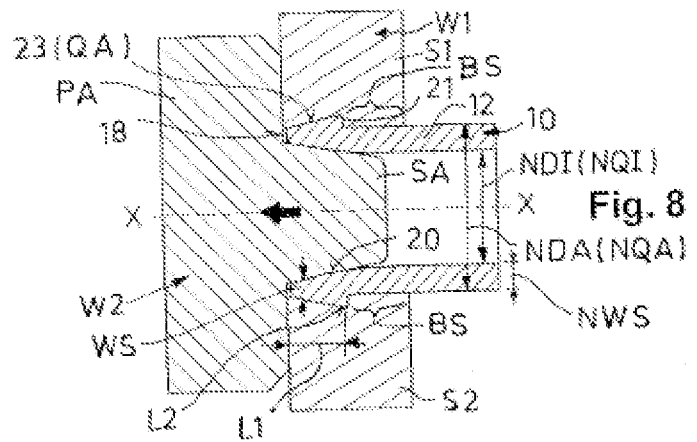

FIG. 7 shows a first state of the reshaping and FIG. 8 the final state of the reshaping process, in which the desired contour of the connection ends 12 has been fully formed. The angle of the conical surface of the decreasing inner contour is then complementary to the point angle t of the second tool element W2.

FIG. 5 shows—which has not yet been mentioned—that the end face 18 of the connection end 12, after receiving the pipeline 10, aligns with a surface A of the segments S1, S2, which faces the second tool element W2. Subject to the relative position of the end face 18 to the surface A of the segments S1, S2, the character of the reshaping process can be determined in the process steps shown in FIG. 7 and FIG. 8. If the two surfaces 18, A are aligned, or the end face 18 recoils axially opposite to the surface A of the segments S1, S2, the second tool element W2 brings about the inventive reshaping, during both radial widening 20 and compression, and also during contouring in the mold F. Compression here has the character of purely radial compression. However, when the end face 18, after clamping, projects axially opposite the surface A of the segments S1, S2, the second tool element W2 also brings about a reshaping during radial widening 20, during compression, and during contouring in the mold F. However here, the compression, in addition to the radial components of the compression, also has an axial component, whose magnitude, if needed, can be determined by means of the overhang of the end face of the pipeline 10 compared to the surface A of the segments S1, S1. In this way, the ratio of the inner material difference MI and the outer material difference MA, as well as the wall thickness WS of the end face 18 after reshaping can be varied.

Figure 9:
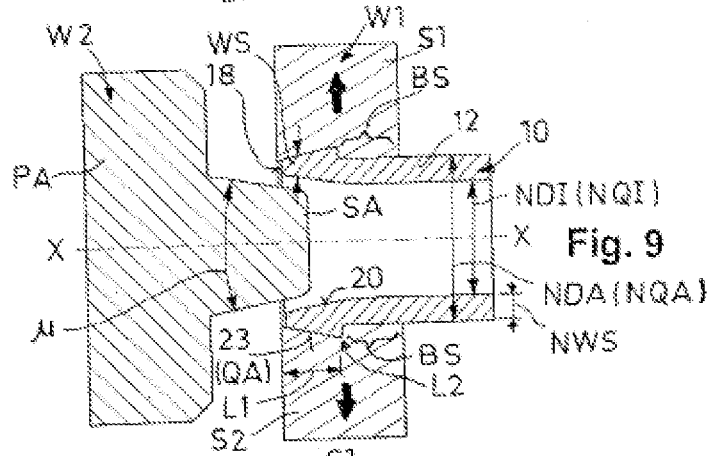
Figure 10:
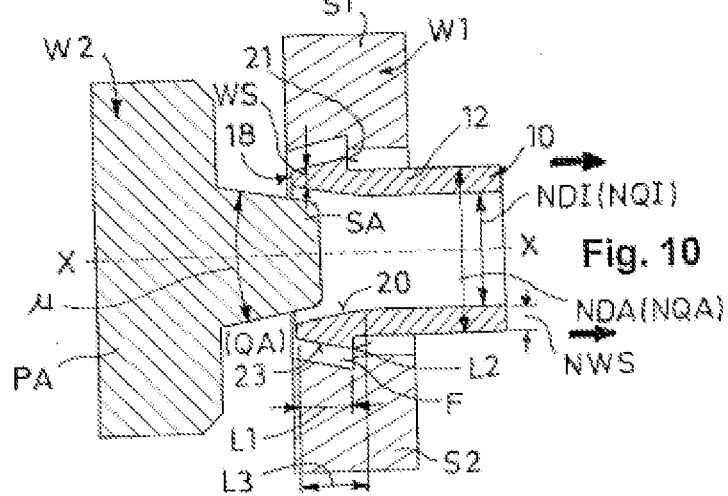

The second tool element W2 can now be moved again in the direction of the arrow in FIG. 8, so that it assumes the position shown in FIG. 9. After that, the segments S1, S2 of the first tool element W1 are opened in the direction of the arrows shown in FIG. 9, and as a final state, there is an arrangement according to FIG. 10, in which the de-molded pipeline 10, comprised of the segments S1, S2, can be removed from the tool.

FIGS. 11 to 15 present various modifications of the toolkit comprising the first tool element W1 and the second tool element W2 for implementing the method according to the principles of the present invention. Here the connection end 12 of the pipeline 10 is always shown in its first embodiment.

Figure 11:
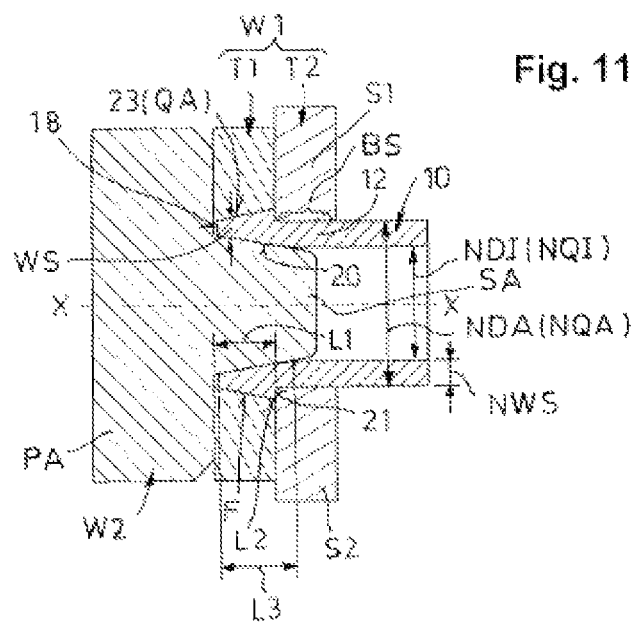
FIG. 11 is an axial section through a connection end of a pipeline of the first embodiment of a screwed pipe joint together with a second embodiment of a toolkit for implementing the method according to the principles of the invention.

In the embodiment of the toolkit according to FIG. 11, the second tool element W2 is designed in the manner, as described above. However, the first tool element W1 is comprised here of two parts T1, T2 arranged axially one after the other. These parts T1, T2 bring about—at least in part—a separation of the molding function and the clamping function. The first, shaping part T1, which faces the second tool element W2, is designed here as a completely closed ring, whereas the second part T2, which has a clamping function, is comprised, in turn, of the segments S1, S2. The mold F is comprised here, on the one hand, of a conically shaped circumferential surface in the first part T1. This produces, in the first longitudinal section L1, the externally located limb 23 of the trapezoid, the steady increase in the outside cross-section QA. On the other hand, the mold F is produced by the axial abutment of the second part T2 on the first part T1, which is open to the rear. In this way then, in the second longitudinal section L2, the ring surface 21 is produced that suddenly reduces the cross-section. This design of the toolkit has the advantage that with the closed annular form of the first part T1, no ridges caused by joints can form in the section 23—which is important for the sealing function—during the reshaping of the connection end 12 of the pipeline 10. However, at the same time, due to a radial opening of the segments S1, S2 away from each other, it is always possible to have problem-free de-molding of the reshaped connection end 12 from the ring piece of the first tool element W1.

For moving the tool elements W1, W2, with a corresponding rearrangement of the tool elements, a device can be used in the outer region as described in EP 1 494 827 B1.

Figure 12:
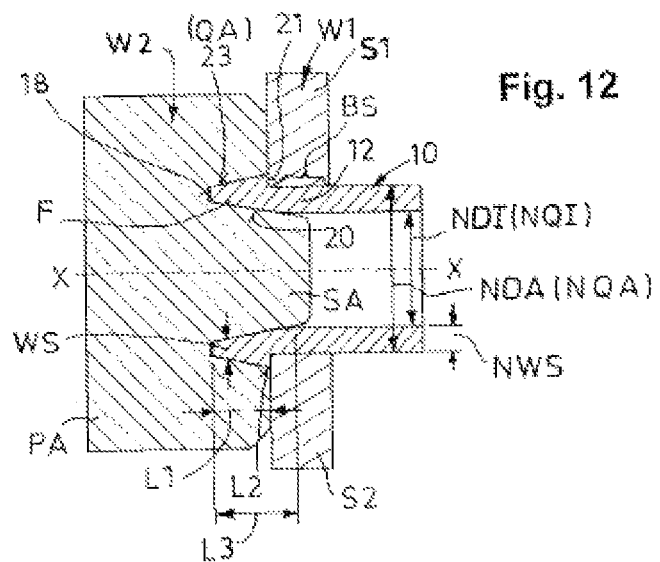
FIG. 12 is an axial section through a connection end of a pipeline of the first embodiment of a screwed pipe joint, together with a toolkit in a third embodiment according to the invention.

With the embodiment of the toolkit according to FIG. 12, the second tool element W2 is designed in such a way that when using it, on the one hand—as described—the radial widening of the pipeline 10 takes place, but also, on the other hand, the molding takes place in this tool element W2. Thus, the mold F is mainly developed here in the second tool element W2. However, the annular surface 21 of the contour of the connection end 12 is, in turn, formed by the abutment of the first tool element W1, as described above, for the second part T2 of the first tool element W1. This design of the toolkit has the advantage of a lesser tool design complexity, however the fact must be taken into account that during reshaping, greater frictional forces occur in the second tool element W2, namely outside on the stamping section SA and inside in the plate section PA. This requires greater forces and correspondingly greater clamping lengths during reshaping.

Figure 13:
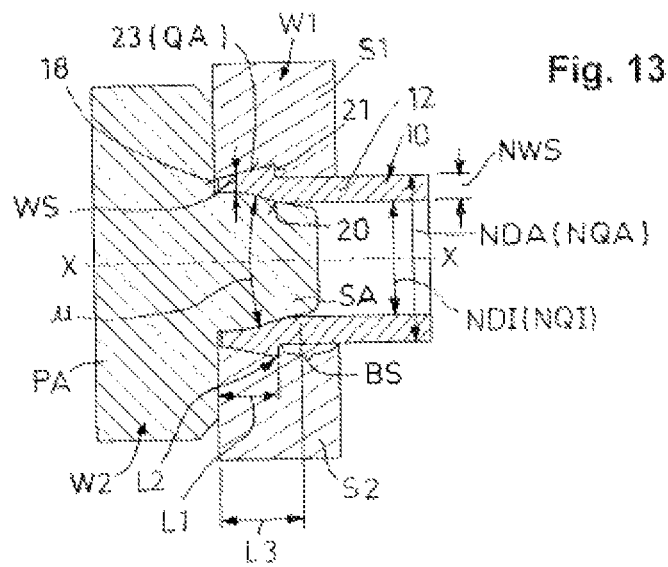
FIG. 13 is an axial section through a connection end of a pipeline of the first embodiment of a screwed pipe joint, together with a toolkit in a fourth embodiment according to the invention.

The embodiment of the toolkit according to FIG. 13 corresponds to that of FIGS. 2 and 3, or as the case may be, FIGS. 5 to 10. The distinctive characteristic consists of the stamping section SA of the second tool element W2 not having an outer contour that is designed as purely conical, but rather as wave-like. In this way, during reshaping, a greater wall thickness WS can advantageously be retained at a point at which the radial widening 20 merges with the nominal inner diameter NDI of the pipeline 10. The point angle $\mu$ of the second tool element W2 is thus variable here over the axial length of the stamping section. The previous statements about the preferred size range of 5° to 60° and the optimum range of 20° to 40° of the point angle can be applied, with this nonlinear contour, to the angle of elevation of tangents applied in each case at each point on the curve.

Figure 14:
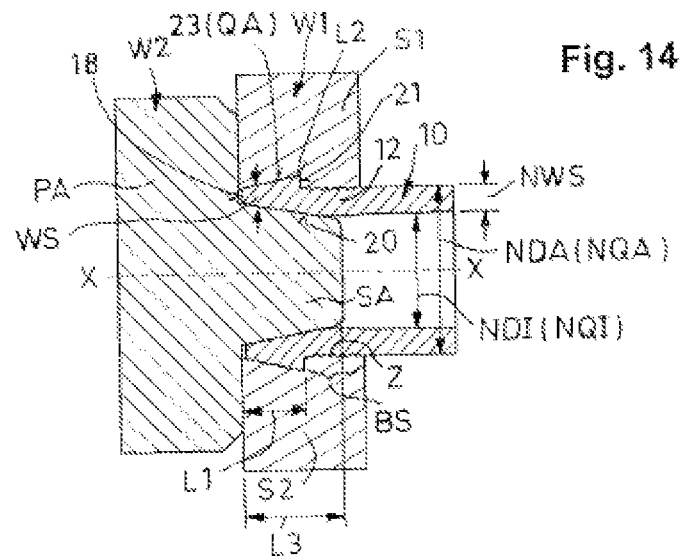
FIG. 14 is an axial section through a connection end of a pipeline of the first embodiment of a screwed pipe joint, together with a toolkit in a fifth embodiment according to the invention.

The embodiment of the toolkit according to FIG. 14 also corresponds to that of FIGS. 2 and 3, or as the case may be, FIGS. 5 to 10. The specific characteristic of this embodiment is that the segments S1, S2 of the first tool element W1—which serve the purpose of clamping—have, in the contact region with the pipeline 10, in the clamping range BS, contour elements, a gearing Z, or a roughened surface that heightens the retention forces on the pipeline 10 during the reshaping process.

Figure 15:
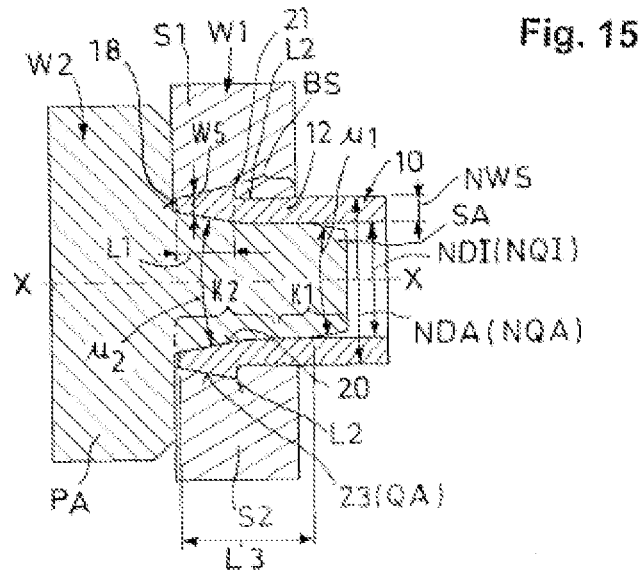
FIG. 15 is an axial section through a connection end of a pipeline of the first embodiment of a screwed pipe joint together with a toolkit in a sixth embodiment according to the invention.

With the additional embodiment of a toolkit shown in FIG. 15, the second tool element W2 has two conical, or as the case may be, radially widening sections K1, K2, each with a point angle $\mu1$, $\mu2$. The first section K1 initially compresses the pipeline 10 from inside in the retention area of the clamping jaws (clamping range BS), after which the second section K2 causes the radial widening of the pipeline 10. With this embodiment, the retention force is advantageously heightened during reshaping. Both point angles $\mu1$, $\mu2$ can again advantageously lie within the range of 5° to 60°, preferably within the range of 20° to 40°.

Using the inventive method, the connection ends 12 of pipelines 10 can be formed in a great variety of ways for the inventive screwed pipe joint. FIGS. 16, 18, 20, and 29 thus show additional advantageous contour designs for connection ends 12; the respectively assigned FIGS. 17, 19, 21, as well as FIG. 30 show the respective tool elements W1, W2 with the corresponding negative contour.

Figure 16:
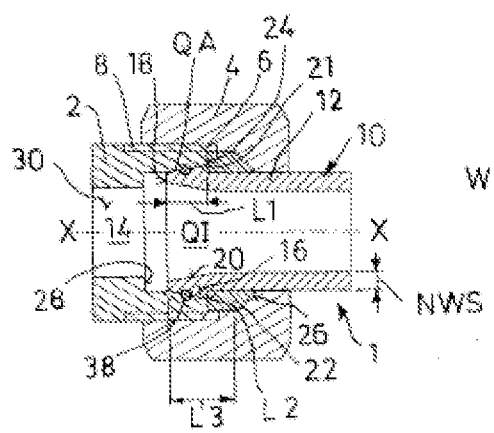
FIG. 16 is a representation similar to that seen in FIG. 1, however scaled down, of an axial section through a second embodiment of an screwed pipe joint in a screwed-in state of assembly.
Figure 17:
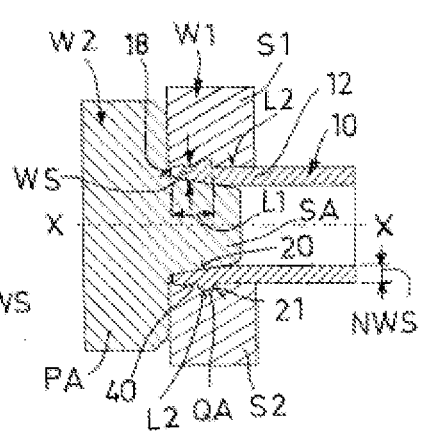
FIG. 17 is a representation similar to that seen in FIG. 2, however scaled down, of an axial section through a connection end of a pipeline of the second embodiment of a screwed pipe joint, together with a seventh embodiment of a toolkit for implementing a method according to the invention.
Figure 17A:
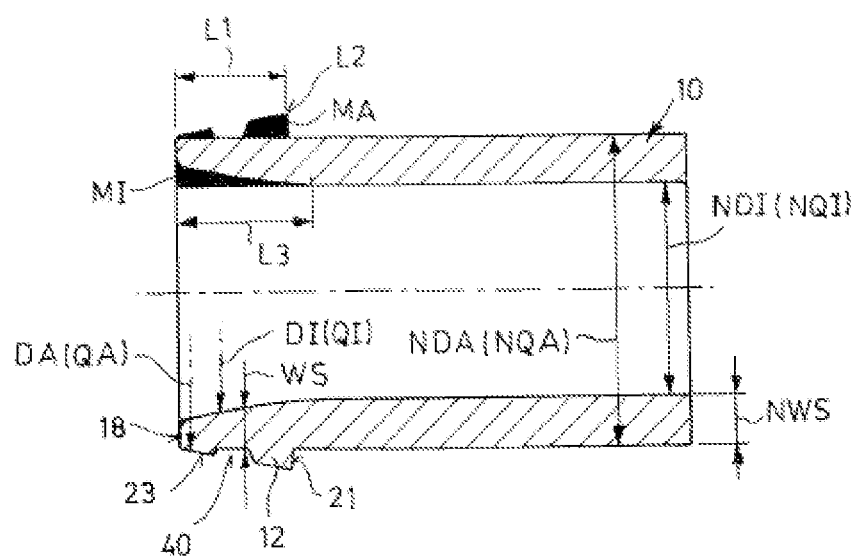
FIG. 17a is an axial section through a connection end of a pipeline of the second embodiment, enlarged.

FIGS. 16, 17, and 17a refer to a design with a further contour. FIG. 17a shows—as also presented in FIG. 2a—that the inner material difference MI and the outer material difference MA correspond to each other. In FIG. 16, an O-ring seal is designated with the reference sign 38, and in FIGS. 17 and 17a, a groove provided for them is given the reference sign 40. The presence of the groove 40 shows that there does not necessarily have to be a steady increase in the outer cross-section QA in the first longitudinal section L1, but rather that the outer cross-section QA at the end of the first longitudinal section L1 is larger than the nominal outer cross-section NQA. Because of the undercut in the groove 40, the shaping first tool element W1 must again be divided into at least two segments S1, S2, in order to enable a de-molding of the reshaped pipe end. The connection end 12 of the pipeline 10 is not executed with respect to its inner diameter as having the same cross-section as the remaining pipe body, but rather, proceeding from the end face 18 opposite the connection part 2, the clear inner cross-section QI of the pipeline 10 decreases in axial direction.

Figure 18:
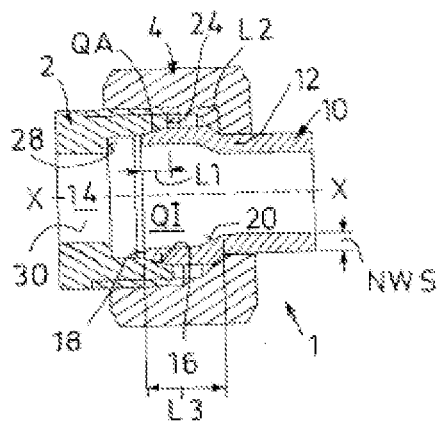
FIG. 18 is a representation similar to that seen in FIG. 16, of an axial section through a third embodiment of a screwed pipe joint in a screwed-in state of assembly.
Figure 19:
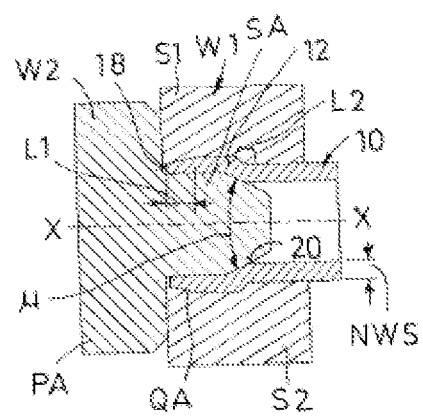
FIG. 19 is a representation similar to that seen in FIG. 17, of an axial section through a connection end of a pipeline of the third embodiment of a screwed pipe joint, together with a toolkit in an eighth embodiment according to the invention.

FIGS. 18 and 19 illustrate an inventive screwed pipe joint 1 in which no additional annular part, such as a distance ring 22, is required for a positive and/or force-fitted clamping of the wall region of the connection end 12 of the pipeline 10 between the connection part 2 and the screwed connection 4. The pipeline 10, with its second longitudinal section L2, in which the outer cross-section QA of the pipeline 10 formed by the wall region of the connection end 12 once again decreases in axial direction, abuts directly on the union joint part 4.

Figure 20:
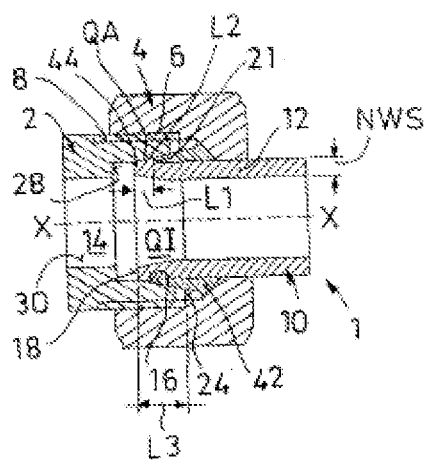
FIG. 20 is a representation similar to that seen in FIG. 16, of an axial section through a fourth embodiment of a screwed pipe joint in a screwed-in state of assembly according to the invention.
Figure 21:
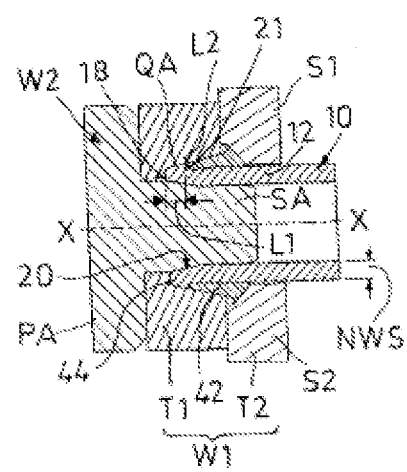
FIG. 21 is a representation similar to that seen in FIG. 17, of an axial section through a connection end of a pipeline of the fourth embodiment of a screwed pipe joint together with a toolkit in a ninth embodiment according to the invention.

In FIGS. 20 and 21, an embodiment of an inventive screwed pipe joint 1 and the associated toolkit are represented, in the case of which, in a first step, an annular part, in particular a cutting ring 42, cuts into the wall of the pipeline 10 and in this way axially secures the pipe, after which, in a second step, by means of inner widening, there is the formation of the outer cross-section QA, which, pointing away from the end face 18 widens in a first longitudinal section L1 and tapers in a second longitudinal section L2, as well as the formation of the tapering inner cross-section QI.

Compared to the cutting-ring connections known from the prior art, the advantage should be pointed out here that the contour molded onto the pipeline 10 in the longitudinal section L1 abuts directly against the inner conical bore surface 16 of the connection part 2, which results in the considerably improved assembly behavior mentioned above.

Similar to the way in which this is done in FIGS. 5 to 10 for the first embodiment, the process of the inventive method for the embodiment with the cutting ring 42 is shown in FIGS. 22 to 28.

To start with, FIG. 22 shows the basic position with the opened segments S1, S2 of a second part T2 of the first tool element W1. The pipeline 10 is located between the two segments S1, S2. The end face 18 of the connection end 12 abuts against an inside ring shoulder B of a first part T1—which is opposite to the second tool element W2—of the first tool element W1. This first part, with a conically shaped inner design, also presents the mold F for making the contour on the connection end 12. The pipeline 10 is slid onto the clear end of the stamping section SA of the second tool element W2, or as the case may be the stamping section SA is inserted into the pipeline 10. The cutting ring 42 is already resting on the pipeline 10.

Now the segments S1, S2 of the second part T2 of the first tool element W1 are driven against each other in the sense of the arrows shown in FIG. 22. The unique feature of this embodiment is that the segments S1, S2 have no real clamping function. They are merely holding plates providing axial support. The actual clamping is done by the cutting ring 42, so that this cutting ring serves advantageously, on the one hand, as a component in the formation of the inventive screwed pipe joint 1, and on the other hand as a clamping tool for producing it. The first tool element W1 is thus comprised of its two parts T1, T2, and the cutting ring 42. The closed first tool element W1 is shown in FIG. 23.

Subsequently, the first part T1 of the first tool element W1 is driven axially, in the sense of the arrow in FIG. 23, in the direction of the second part T2 of the first tool element W1, so that the two parts T1, T2 abut against each other. During this process, the cutting ring 42 is formed on the pipeline 10, as shown in FIG. 24. After that has taken place, the radial widening of the connection end 12 now begins, with the stamping section SA of the second tool element W2 being driven axially farther into the connection end 12 of the pipeline 10. This is indicated by the arrow in FIG. 24. At the same time, by means of the second tool element W2, the material of the wall region that is to be reshaped is forced out of its original position and into the mold F of the first part T1 of the first tool element W1. In that way, the final state of reshaping illustrated in FIG. 25 is achieved, in which state the desired contour is completely formed on the connection end 12.

The increase in the outer cross-section QA that occurs in the first longitudinal section L1 is produced by means of a lug 44 on the end face (see FIG. 21), said lug being formed in the mold F. This merges axially with the conically running outer side of the cutting ring 42. A rearward annular surface 21 of the connection end 12, said surface being opposite to the cutting ring 42, forms the region in which, in the second longitudinal section L2, the outer cross-section QA of the pipeline 10 once again decreases in axial direction.

The second tool element W2 can now once again be driven back axially in the direction of the arrow in FIG. 25, so that it is brought into the position shown in FIG. 26. Then, in the sense of the arrows shown in FIG. 26, the first part T1 of the first tool element W1 is axially withdrawn from the second part T2 of the first tool element W1, so that the pipeline 10—as shown in FIG. 27—is de-molded. In order for a removal of the same to be possible, as shown in FIG. 28, all that now has to be done is to open the segments S1, S1 in the sense of the arrows shown in FIG. 27.

In FIGS. 29 to 31, an embodiment of an inventive screwed pipe joint 1 and appurtenant toolkit are presented, in which the screwed connection deviates only slightly from that described above. However, the toolkit used is different. Instead of a plurality of holding plates comprised of segments S1, S2, in this case, only a single backing plate is used as the second part T2 of the first tool element W1, said backing plate being in particular provided with a U-shaped recess. This backing plate, in combination with the union joint part 4 performs the function of axially securing the cutting ring 42. The diameter of the first part T1 of the first tool element W1 is reduced to such a degree that it fits into the interior of the union joint part 4.

This procedure, which is known from cutting-ring assembly, results in the following additional advantage with respect to the invention: because the coupling nut, with this embodiment, is arranged in the region of the tool elements W1, W2, rather than behind them, even shorter straight pipe lengths can be implemented behind the connection. Thus, a pipe bend can, for example, start immediately behind the union joint part 4.

After the inner widening of the connection end 12 of the pipeline 10 by means of the two tool elements W1, W2 that follows the cutting-ring assembly, said tool elements can immediately be used for sealing off the connection part 2, for example by inserting a standardized 24E cone connecting piece, or another connecting part.

The invention is not limited to the depicted and described embodiments, but rather includes also all embodiments that produce the same effect as the invention, in particular contourings of the connection end 12 of the pipeline 10 which, in the context of claim 1, deviate from those described above.

The design of the pipeline itself is also assigned inventive significance.

Furthermore, a person skilled in the art can complement the invention with appropriate technical measures without going beyond the framework of the invention. Thus, for example, the features and the arrangement of the distance ring 22 in the case of the first embodiment of the inventive screwed pipe joint 1 correspond to those of the EP 1 260 750 B1 mentioned at the beginning, to which comprehensive reference will be made regarding further technical details and advantages.

The tool elements W1, W2 used for reshaping should be comprised of materials that have a higher resistance than the material of the pipeline 10, and which should, in particular, consist of hardened tool steel. In the interest of reducing the forces that have to be applied for operation, the surface of the tool elements W1, W2—with the exception of the clamping range BS—can be formed, preferably by means of mechanical treatment such as polishing, or with the presence of a coating, in such a way as to reduce friction in the friction combination with the pipeline 10 during reshaping.

Furthermore, the invention is thus far not restricted to the combinations of features defined in claims, but can rather be defined by any other arbitrary combination of specific features from the totality of disclosed individual features. This means that in practice, basically any individual feature of the independent claims can be omitted, or as the case may be replaced by at least one individual feature disclosed in another passage in the application. In this respect, the claims are to be understood only as a first attempt at formulation for an invention.

The invention claimed is:

1. A method for producing a screwed pipe joint comprising the steps of:

reshaping a wall region of a connection end of a pipeline by the application of force in the axial direction of the pipeline, during the reshaping step an outer contour of the connection end is shaped in a mold of a tool element, radially widening a nominal inner cross-section of the pipeline such that the wall region of the connection end is compressed into the mold of the tool element by a force that acts at an angle to the axial direction; and clamping the pipeline in a clamping element during reshaping against an axial displacement of the pipeline, securing of the pipeline occurring within a clamping range located beyond a length range that is to be reshaped, the length range being measured from an end face of the connection end, during clamping of the pipeline a cutting ring is positioned in the clamping range and retained in the screwed pipe joint.

2. The method according to claim 1, further comprising the step of forming the mold at least in part in the tool element.

3. The method according to claim 1, further comprising the step of forming the mold of the tool element by interaction of a first tool element and a second tool element.

4. The method according to claim 1, wherein the reshaping step of the connection end is produced by cold forming.

5. The method according to claim 1, wherein the step of radially widening includes the step of axially moving a stamp-like second tool element from an end face of the connection end into the connection end of the pipeline, and which, at the same time, forces material of the wall region that is to be reshaped out of an original position and into the mold.

6. The method according to claim 5, wherein the second tool element is provided with a conical tapering, wherein a point angle ($\mu$) of the conical taper lies in the range of 5° to 60°.

7. The method according to claim 5, wherein the second tool element is provided with a conical tapering, wherein a point angle ($\mu$) of the conical taper lies in the range of 20° to 40°.

8. The method according to claim 1, wherein clamping of the pipeline is performed by segments of a tool element used as clamping elements, said segments seamlessly enclosing an outer surface of the pipeline.

9. The method according to claim 8, wherein the segments have contour elements in the clamping region with the pipeline which increase the retention forces on the pipeline during the reshaping process.

10. The method according to claim 1, wherein the tool element includes a plurality of parts, whose detachment from each other produces a de-molding of a reshaped connection end from the tool element.

11. The method according to claim 1, wherein the tool element includes a circumferentially closed ring.

12. The method according to claim 1, wherein during reshaping the tool element forms a structural unit with the clamping element.

13. The method according to claim 1, wherein the mold of the tool element includes a mechanically treated or coated surface resulting in a reduction in friction with the pipeline during reshaping.

* * * * *